(12) United States Patent
Yamashiro

(10) Patent No.: US 10,533,083 B2
(45) Date of Patent: Jan. 14, 2020

(54) RUBBER COMPOSITION AND TIRE

(71) Applicant: SUMITOMO RUBBER INDUSTRIES, LTD., Kobe-shi, Hyogo (JP)

(72) Inventor: Yuhei Yamashiro, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 289 days.

(21) Appl. No.: 15/610,022

(22) Filed: May 31, 2017

(65) Prior Publication Data

US 2017/0369685 A1    Dec. 28, 2017

(30) Foreign Application Priority Data

Jun. 28, 2016    (JP) .................. 2016-127844

(51) Int. Cl.

| | | |
|---|---|---|
| *C08L 9/00* | (2006.01) | |
| *C08L 9/06* | (2006.01) | |
| *C08K 5/548* | (2006.01) | |
| *C08L 91/06* | (2006.01) | |
| *C08K 5/47* | (2006.01) | |
| *C08K 3/22* | (2006.01) | |
| *B60C 1/00* | (2006.01) | |
| *C08K 5/09* | (2006.01) | |
| *C08K 5/18* | (2006.01) | |
| *C08K 3/06* | (2006.01) | |
| *C08L 91/00* | (2006.01) | |
| *C08K 3/36* | (2006.01) | |
| *C08K 3/04* | (2006.01) | |

(52) U.S. Cl.
CPC .............. *C08L 9/06* (2013.01); *B60C 1/0016* (2013.01); *C08K 3/04* (2013.01); *C08K 3/06* (2013.01); *C08K 3/22* (2013.01); *C08K 3/36* (2013.01); *C08K 5/09* (2013.01); *C08K 5/18* (2013.01); *C08K 5/47* (2013.01); *C08K 5/548* (2013.01); *C08L 9/00* (2013.01); *C08L 91/00* (2013.01); *C08L 91/06* (2013.01)

(58) Field of Classification Search
CPC .... C08L 9/00; C08L 9/06; C08K 3/04; C08K 3/36

See application file for complete search history.

(56) References Cited

U.S. PATENT DOCUMENTS

| | | | |
|---|---|---|---|
| 2013/0180637 A1 | 7/2013 | Hattori et al. | |
| 2016/0108213 A1* | 4/2016 | Inoue | ..................... C08L 15/00 523/156 |
| 2018/0066128 A1* | 3/2018 | Zartman | .................. C08L 9/00 |

FOREIGN PATENT DOCUMENTS

JP    2013-163803 A    8/2013

* cited by examiner

*Primary Examiner* — Peter D. Mulcahy
(74) *Attorney, Agent, or Firm* — Birch, Stewart, Kolasch & Birch LLP

(57) ABSTRACT

An object of the present invention is to provide a rubber composition which is excellent in wet grip performance and abrasion resistance without deteriorating fuel efficiency, and a tire having a tread composed of the rubber composition. The present invention relates to a rubber composition comprising a rubber component comprising 20 to 90% by mass of a rubber component A and 10 to 80% by mass of a rubber component B, wherein an SP value of the rubber component A is not less than 17.8 $(J/cm^3)^{1/2}$ and an SP value of the rubber component B is lower than the SP value of the rubber component A by not less than 0.6 $(J/cm^3)^{1/2}$, and a tire having a tread composed of the rubber composition.

8 Claims, No Drawings

RUBBER COMPOSITION AND TIRE

TECHNICAL FIELD

The present invention relates to a rubber composition and a tire.

BACKGROUND OF THE INVENTION

Recently, due to a requirement for reduction of fuel consumption of a vehicle, a development of a tire having reduced rolling resistance and inhibited heat generation has been promoted, and in particular, excellent fuel efficiency is required for a tread because it has a high occupation rate in a tire. As a method of improving fuel efficiency of a rubber composition for tire, a method of replacing carbon black, which has been used as a filler for reinforcement, with silica, a method of reducing an amount of a filler for reinforcement, a method of using a filler for reinforcement that has a large particle diameter and the like are known. However, these methods have a problem that abrasion resistance is largely deteriorated and a reduction of the amount of a filler for reinforcement further lowers wet grip performance, and therefore, achievement of all of fuel efficiency, abrasion resistance and wet grip performance is difficult because they are generally in a trade-off relationship.

In JP 2013-163803 A, there is disclosed a kneading method of a rubber composition comprising diene rubbers having different SP values in consideration of dispersibility of carbon black, however, achievement of all of fuel efficiency, abrasion resistance and wet grip performance is not considered.

SUMMARY OF THE INVENTION

An object of the present invention is to provide a rubber composition which is excellent in wet grip performance and abrasion resistance without deteriorating processability and fuel efficiency, and a tire having a tread composed of this rubber composition.

The present invention relates to a rubber composition comprising a rubber component comprising 20 to 90% by mass of a rubber component A and 10 to 80% by mass of a rubber component B, wherein an SP value of the rubber component A is not less than 17.8 $(J/cm^3)^{1/2}$ and an SP value of the rubber component B is lower than the SP value of the rubber component A by not less than 0.6 $(J/cm^3)^{1/2}$.

It is preferable that the rubber component A comprises a styrene-butadiene rubber.

It is preferable that the rubber component A comprises a modified styrene-butadiene rubber.

It is preferable that a content of the rubber component A is 50 to 90% by mass and a content of the rubber component B is 10 to 50% by mass.

It is preferable that the rubber composition comprises 10 to 200 parts by mass of silica based on 100 parts by mass of the rubber component.

It is preferable that a weight-average molecular weight of the rubber component A is not more than 800,000.

The present invention also relates to a tire having a tread composed of the above rubber composition.

The rubber composition and the tire having a tread composed of the rubber composition of the present invention are excellent in wet grip performance and abrasion resistance while maintaining processability and fuel efficiency.

DETAILED DESCRIPTION

An embodiment of the present invention is a rubber composition comprising a rubber component comprising 20 to 90% by mass of a rubber component A and 10 to 80% by mass of a rubber component B, wherein an SP value of the rubber component A is not less than 17.8 $(J/cm^3)^{1/2}$ and an SP value of the rubber component B is lower than the SP value of the rubber component A by not less than 0.6 $(J/cm^3)^{1/2}$.

An SP value as used herein is a parameter of solubility and a value calculated in accordance with Rubber Chemistry and Technology 69, (1996) 769. In addition, an SP value of each rubber can be recognized based on experimental results from KGK 58 (2005) 1 and according thereto, an SP value of a natural rubber is 16.7, an SP value of a butadiene rubber is 17.17 and an SP value of a styrene-butadiene rubber can be calculated by the following formula.

$$17.17 + 0.0272 \times (\text{styrene content (\% by mass)}) - 0.0069 \times (\text{vinyl bond amount (mol \%)}) \quad \text{Formula}$$

The rubber component comprises a rubber component A having an SP value of not less than 17.8 $(J/cm^3)^{1/2}$ and a rubber component B having an SP value which is lower than the SP value of the rubber component A by not less than 0.6 $(J/cm^3)^{1/2}$. Since the rubber component A and the rubber component B form an incompatible structure, properties of both the rubber component A and the rubber component B can be exerted and a rubber composition which is excellent in wet grip performance and abrasion resistance while maintaining sufficient processability and fuel efficiency can be provided.

The SP value of the rubber component A is not less than 17.8 $(J/cm^3)^{1/2}$, preferably not less than 18.0 $(J/cm^3)^{1/2}$. If the SP value is less than 17.8 $(J/cm^3)^{1/2}$, the compatibility with the rubber component B is high and it may be difficult to functionally express respective properties of the rubber component A and the rubber component B. An upper limit of the SP value of the rubber component A is not limited particularly, but from the viewpoint of deterioration of processability and deterioration of fuel efficiency due to a styrene block, the SP value is preferably not more than 18.6 $(J/cm3)^{1/2}$.

Examples of the rubber component A include a styrene-butadiene rubber (SBR), a styrene-isoprene-butadiene rubber (SIBR), a chloroprene rubber (CR), an acrylonitrile-butadiene rubber (NBR) and the like. They may be used alone or may be used in combination of two or more thereof. Among these, SBR is preferable since the effect of the present invention can be exerted more efficiently.

The SBR is not limited particularly as long as it satisfies the above SP value and examples thereof include an un-modified solution-polymerized SBR (S-SBR), an un-modified emulsion-polymerized SBR (E-SBR) and a modified SBR thereof (modified S-SBR and modified E-SBR) and the like. Among these SBRs, S-SBR and a modified S-SBR are preferable from the viewpoint of a balance between fuel efficiency and wet grip performance, and a modified S-SBR is preferable since it is excellent in fuel efficiency.

SBRs which are generally used in the tire industry can be respectively treated with a modifier to be used as a modified SBR. Examples of the modifier include 3-aminopropyldimethylmethoxysilane, 3-aminopropylmethyldimethoxysilane, 3-aminopropylethyldimethoxysilane, 3-aminopropyltrimethoxysilane, 3-(2-aminoethylamino)propyltrimethoxysilane, tin tetrachloride, butyltin trichloride, N-methylpyrrolidone and the like. They may be used alone or may be used in combination of two or more thereof. Among these, N-methylpyrrolidone is preferable since the effect of the present invention can be sufficiently obtained.

Conventional known methods such as a method described in JP H06-53768 B2, JP H06-57767 B2, JP 2003-514078 A or the like can be used as a method of modifying SBR with the above modifier. For example, SBR can be brought into contact with a modifier and examples of such method include a method of, after synthesizing SBR by an anion polymerization, adding a specified amount of a modifier into a polymer rubber solution such that a polymer terminal (active terminal) of the SBR is reacted with the modifier, or a method of adding a modifier into an SBR solution to cause a reaction, and the like.

A styrene content of the SBR is preferably not less than 30% by mass, more preferably not less than 35% by mass since the SBR having a sufficient SP value can be obtained. On the other hand, the styrene content of the SBR is preferably not more than 60% by mass, more preferably not more than 50% by mass from the viewpoint of processability. It is noted that the styrene content of the SBR as used herein is a value calculated from a $^1$H-NMR measurement.

A vinyl bond amount of the SBR is preferably not less than 15 mol %, more preferably not less than 20 mol % for preventing a styrene chain. On the other hand, the vinyl bond amount of the SBR is preferably not more than 40 mol %, more preferably not more than 35 mol % since the SBR having a sufficient SP value can be obtained. It is noted that a vinyl bond amount of the SBR as used herein refers to a vinyl bond amount of a butadiene part and is a value calculated from a $^1$H-NMR measurement.

A glass-transition temperature (Tg) of the rubber component A is preferably not lower than −45° C., more preferably not lower than −40° C. On the other hand, the Tg is preferably not higher than 10° C. and from the viewpoint of prevention of a crack due to embrittlement during a winter season in the temperate zone, the Tg is preferably not higher than 5° C. It is noted that a glass-transition temperature of the rubber component as used herein is a value measured by conducting a differential scanning calorimetry measurement (DSC) under the condition of a temperature elevation rate of 10° C./minute in accordance with JIS K 7121.

A weight-average molecular weight (Mw) of the rubber component A is preferably not less than 200,000, more preferably not less than 300,000, further preferably not less than 400,000 from the viewpoint of grip performance and abrasion resistance. On the other hand, the weight-average molecular weight is preferably not more than 1,400,000, more preferably not more than 1,200,000 from the viewpoint of processability. Moreover, from the viewpoint of fuel efficiency, the Mw of the rubber component A is preferably not more than 800,000 since a large amount of modified terminals can be used and fuel efficiency can be more improved. It is noted that the weight-average molecular weight of the SBR as used herein can be calibrated with polystyrene standards based on measurement values determined with a gel permeation chromatography (GPC) (GPC-8000 series manufactured by Tosoh Corporation; detector: differential refractometer; column: TSKGEL SUPERMALTPORE HZ-M manufactured by Tosoh Corporation).

A content of the rubber component A in the rubber component is not less than 20% by mass, preferably not less than 30% by mass, more preferably not less than 50% by mass. If the content of the rubber component A is less than 20% by mass, fuel efficiency and wet grip performance may be insufficient. On the other hand, the content of the rubber component A is not more than 90% by mass, preferably not more than 85% by mass. If the content of the rubber component A is more than 90% by mass, processability may be insufficient. It is noted that when two or more rubber components having specified SP values and corresponding to the rubber component A are used, the total content thereof is regarded as the content of the rubber component A.

The rubber component B is a rubber component having an SP value which is lower than that of the rubber component A by not less than 0.6 $(J/cm^3)^{1/2}$ and is incompatible with the rubber component A.

The difference of SP values between the rubber component A and the rubber component B is not less than 0.6 $(J/cm^3)^{1/2}$. If this difference is less than 0.6 $(J/cm^3)^{1/2}$, the incompatibility between the rubber component A and the rubber component B is insufficient and the effect of the present invention may not be obtained. An upper limit of the difference of SP values between the rubber component A and the rubber component B is not limited particularly, but is preferably not more than 19.0 $(J/cm^3)^{1/2}$ since a breaking starting point may arise in a phase boundary if the compatibility between the rubber component A and the rubber component B is extremely low.

If two or more of rubber component A having respective SP values are used, the SP value of rubber component A is calculated by summing up each product of the SP value and the content of the respective rubber components and then dividing the summed up products by the total content of the rubber components A. The obtained value is used as the SP value of the rubber component A for comparison.

The SP value of the rubber component B is preferably not more than 17.4 $(J/cm^3)^{1/2}$, more preferably not more than 17.2 $(J/cm^3)^{1/2}$ for maintaining the incompatibility with the rubber component A at a certain level or more and expressing the respective properties of the rubber component A and the rubber component B. A lower limit of the SP value of the rubber component B is not limited particularly, but is preferably not less than 16.0 $(J/cm^3)^{1/2}$ since if the SP value of the rubber component B is extremely away from that of the rubber component A, a phase boundary between the rubber A and the rubber B becomes a breaking starting point.

Examples of the rubber component B include a styrene-butadiene rubber (SBR), a butadiene rubber (BR), an isoprene-based rubber including a natural rubber (NR) and an isoprene rubber (IR), a butyl rubber (IIR), an ethylene-propylene rubber (EPDM) and the like. They may be used alone or may be used in combination of two or more thereof. Among these, BR and NR are preferable for the reason that they are excellent in a balance of processability and abrasion resistance.

Various BRs can be used as the BR such as, a high cis-1,4-polybutadiene rubber (high-cis BR), a butadiene rubber comprising 1,2-syndiotactic polybutadiene crystals (SPB-containing BR), a modified butadiene rubber (modified BR).

The high-cis BR is a butadiene rubber in which the content of cis-1,4 bond is not less than 90% by mass. Examples of such high-cis BR include BR1220 manufactured by ZEON CORPORATION, BR130B and BR150B manufactured by Ube Industries, Ltd. and the like. Low-temperature property and abrasion resistance can be improved by compounding a high-cis BR.

An example of the SPB-containing BR is not the one in which 1,2-syndiotactic polybutadiene crystals are simply dispersed in the BR, but the one in which 1,2-syndiotactic polybutadiene crystals are chemically bonded with the BR and dispersed therein. Examples of such SPB-containing BR include VCR-303, VCR-412 and VCR-617 manufactured by Ube Industries, Ltd. and the like.

Examples of the modified BR include a modified BR (tin modified BR) obtained by performing polymerization of 1,3-butadiene with a lithium initiator and then adding a tin compound, and further having the molecular terminals bonded with a tin-carbon bond, a butadiene rubber (modified BR for silica) having an alkoxysilane condensate compound in an active terminal thereof and the like. Examples of such modified BRs include BR1250H (tin modified) manufactured by ZEON CORPORATION, S-modified polymer (modified for silica) manufactured by Sumitomo Chemical Industry Company Limited and the like.

Among these various BRs, a high-cis BR is preferable since it is excellent in low-temperature property and has satisfactory abrasion resistance.

A weight-average molecular weight (Mw) of the rubber component B is preferably not less than 200,000, more preferably not less than 300,000, further preferably not less than 400,000 from the viewpoint of abrasion resistance. On the other hand, the weight-average molecular weight is preferably not more than 1,200,000, more preferably not more than 1,000,000 from the viewpoint of processability.

A content of the rubber component B in the rubber component is not less than 10% by mass, preferably not less than 15% by mass. If the content of the rubber component B is less than 10% by mass, processability may be insufficient. On the other hand, the content of the rubber component B is not more than 80% by mass, preferably not more than 70% by mass, more preferably not more than 50% by mass. If the content of the rubber component B exceeds 80% by mass, fuel efficiency and wet grip performance may be insufficient.

If two or more of rubber component having respective SP values are used, in the same manner as in the rubber component A, the SP value of rubber component B is calculated by summing up each product of the SP value and the content of the respective rubber components and then dividing the summed up products by the total content of the rubber components B. The obtained value is used as the SP value of the rubber component B for comparison.

The rubber component may comprise a rubber component C other than the rubber component A and the rubber component B. The rubber component C is not limited particularly as long as it does not correspond to the rubber component A or the rubber component B and examples thereof include diene rubbers such as an isoprene-based rubber including a natural rubber (NR) and a polyisoprene rubber (IR), a butadiene rubber (BR), a styrene-butadiene rubber (SBR), a styrene-isoprene-butadiene rubber (SIBR), a chloroprene rubber (CR), an acrylonitrile-butadiene rubber (NBR) and the like. They may be used alone or may be used in combination of two or more thereof.

The rubber composition according to this embodiment may suitably comprise compounding agents or additives which have been generally used in the tire industry from the past, for example, a filler for reinforcement, a coupling agent, zinc oxide, various oils, a softener, wax, various anti-aging agents, stearic acid, a vulcanizing agent such as sulfur, various vulcanization accelerators and the like as necessary in the above rubber component.

Examples of the filler for reinforcement include silica, carbon black, aluminum hydroxide, alumina (aluminum oxide), calcium carbonate, talc, clay and the like and these inorganic fillers may be used alone or may be used in combination of two or more thereof. From the viewpoint of excellent abrasion resistance, durability, wet grip performance and fuel efficiency, silica is preferable.

Examples of the silica include silica prepared by a dry method (anhydrous silica), silica prepared by a wet method (hydrous silica) and the like. For the reason that the number of silanol groups is large, silica prepared by a wet method is preferable. The silica may be used alone or may be used in combination of two or more thereof.

A nitrogen adsorption specific surface area ($N_2SA$) of the silica is preferably not less than 20 $m^2/g$, more preferably not less than 30 $m^2/g$, further preferably not less than 100 $m^2/g$. On the other hand, an upper limit of the $N_2SA$ is preferably not more than 400 $m^2/g$, more preferably not more than 300 $m^2/g$, further preferably not more than 280 $m^2/g$. By use of silica having $N_2SA$ within the above range, fuel efficiency and processability can be achieved in a good balance. It is noted that the $N_2SA$ of the silica is a value measured by a BET method in accordance with ASTM D3037-81.

When the rubber composition comprises silica, a content thereof based on 100 parts by mass of the rubber component is preferably not less than 10 parts by mass, more preferably not less than 15 parts by mass from the viewpoint of fuel efficiency. On the other hand, the content of the silica is preferably not more than 200 parts by mass, more preferably not more than 160 parts by mass, further preferably not more than 120 parts by mass from the viewpoint of dispersibility of the silica, processability and fuel efficiency.

It is preferable that the silica is used in combination with a silane coupling agent. Any silane coupling agent which has been used in combination with silica in the rubber industry can be used as the silane coupling agent and examples thereof include: sulfide silane coupling agents such as bis(3-triethoxysilylpropyl)disulfide and bis(3-triethoxysilylpropyl)tetrasulfide; mercapto silane coupling agents (mercapto group-containing silane coupling agents) such as 3-mercaptopropyltrimethoxysilane, and NXT-Z100, NXT-Z45 and NXT manufactured by Momentive Performance Materials; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone or may be used in combination with two or more thereof. Among them, sulfide silane coupling agents and mercapto silane coupling agents are preferable from the viewpoint of their strong binding force with silica and excellent fuel efficiency. In addition, mercapto silane coupling agents are more preferable since they can suitably improve fuel efficiency and abrasion resistance.

When the rubber composition comprises a silane coupling agent, a content thereof based on 100 parts by mass of the silica is preferably not less than 4.0 parts by mass, more preferably not less than 6.0 parts by mass since a sufficient effect of improving dispersibility of fillers and an effect of reducing a viscosity and the like can be obtained. On the other hand, the content of the silane coupling agent is preferably not more than 12 parts by mass, more preferably not more than 10 parts by mass since if the content exceeds 12 parts by mass, a sufficient coupling effect and an effect of dispersing silica cannot be obtained and reinforceability is lowered.

The carbon black is not limited particularly and examples thereof include furnace black, acetylene black, thermal black, channel black, graphite and the like and these carbon blacks may be used alone or may be used in combination with two or more thereof. Among them, furnace black is preferable since it is excellent in abrasion resistance.

A nitrogen adsorption specific surface area ($N_2SA$) of the carbon black is preferably not less than 70 $m^2/g$, more preferably not less than 90 m$^2$/g since sufficient reinforceability and abrasion resistance can be obtained. On the other hand, the N$_2$SA of the carbon black is preferably not more than 300 m$^2$/g, more preferably not more than 250 m$^2$/g from the viewpoint of excellent dispersibility and low heat build-up property. ft is noted that the N$_2$SA of the carbon black as used herein is a value measured in accordance with JIS K 6217-2, "Carbon black for rubber industry, fundamental characteristics—Part 2: Determination of specific surface area—Nitrogen adsorption methods—Single-point procedures".

When the rubber composition comprises the carbon black, a content thereof based on 100 parts by mass of the rubber component is preferably not less than 3 parts by mass, more preferably not less than 4 parts by mass. If the content is less than 3 parts by mass, sufficient reinforceability tends not be obtained. On the other hand, the content of the carbon black is preferably not more than 200 parts by mass, more preferably not more than 150 parts by mass, further preferably not more than 60 parts by mass, most preferably not more than 20 parts by mass. If the content exceeds 200 parts by mass, there is a tendency that processability is deteriorated, heat easily generates and abrasion resistance is deteriorated.

The rubber composition of the present embodiment can be produced by a known method. The rubber composition can be produced, for example, by kneading the above-mentioned components with a rubber kneading apparatus such as an open roll, a Banbury mixer or an enclosed kneader and then carrying out vulcanization.

In the rubber composition, the rubber component A and the rubber component B are not compatible to each other and form an incompatible structure, thereby exerting the respective properties of the rubber component A and the rubber component B, and therefore, the rubber composition is excellent in wet grip performance and abrasion resistance while maintaining processability and fuel efficiency.

Another embodiment of the present invention is a tire having a tread composed of the above rubber composition. The tire can be produced by a usual method using the above rubber composition. That is, an unvulcanized rubber composition obtained by kneading the above-mentioned components is extruded into the shape of a tread of a tire, laminated with other components of the tire in a tire building machine and formed by a usual method to form an unvulcanized tire. This unvulcanized tire is heated and pressurized in a vulcanizer to produce the tire of the embodiment.

EXAMPLE

The present invention will be described based on Examples, but the present invention is not limited thereto only.

A variety of chemicals used in Examples and Comparative Examples will be collectively explained below.

SBR 1: Nipol NS616 (modified S-SBR, styrene content: 20% by mass, vinyl bond amount: 67 mol %, SP value: 17.25 (J/cm$^3$)$^{1/2}$, Tg: −25° C., Mw: 510,000, non-oil-extended) manufactured by ZEON CORPORATION SBR 2: one prepared in the production method of SBR 2 as described below (un-modified S-SBR, styrene content: 30% by mass, vinyl bond amount: 46 mol %, SP value: 17.67 (J/cm$^3$)$^{1/2}$, Tg: −28° C., Mw: 480,000, non-oil-extended)

SBR 3: one prepared in the production method of SBR 3 as described below (un-modified S-SBR, styrene content: 35% by mass, vinyl bond amount: 55 mol %, SP value: 17.74 (J/cm$^3$)$^{1/2}$, Tg: −20° C., Mw: 450,000, non-oil-extended)

SBR 4: SLR6430 (un-modified S-SBR, styrene content: 40% by mass, vinyl bond amount: 24 mol %, Mw: 1,040,000, Tg: −31° C., oil-extended product comprising 37.5 parts by mass of oil based on 100 parts by mass of a solid rubber content) manufactured by Styron LLC SBR 5: one prepared in the production method of SBR 5 as described below (un-modified S-SBR, styrene content: 40% by mass, vinyl bond amount: 25 mol %, SP value: 18.09 (J/cm$^3$)$^{1/2}$, Tg: −29° C., Mw: 470,000, non-oil-extended)

SBR 6: one prepared in the production method of SBR 6 as described below (un-modified S-SBR, styrene content: 35% by mass, vinyl bond amount: 30 mol %, SP value: 17.92 (J/cm$^3$)$^{1/2}$, Tg: −33° C., Mw: 460,000, non-oil-extended)

SBR 7: one prepared in the production method of SBR 7 as described below (un-modified S-SBR, styrene content: 30% by mass, vinyl bond amount: 25 mol %, SP value: 17.81 (J/cm$^3$)$^{1/2}$, Tg: −40° C., Mw: 460,000, non-oil-extended)

SBR 8: one prepared in the production method of SBR 8 as described below (un-modified S-SBR, styrene content: 40% by mass, vinyl bond amount: 24 mol %, SP value: 18.09 (J/cm$^3$)$^{1/2}$, Tg: −29° C., Mw: 470,000, non-oil-extended)

BR: BR150B (content of cis-1,4 bond: 96%, SP value: 17.17 (J/cm$^3$)$^{1/2}$) manufactured by Ube Industries, Ltd.

NR: TSR20 (SP value: 16.70 (J/cm$^3$)$^{1/2}$) Silica: Ultrasil VN3 (N$_2$SA: 175 m$^2$/g) manufactured by Evonik Degussa Carbon black: DIABLACK (N339, N$_2$SA: 96 m$^2$/g, DBP oil absorption amount: 124 ml/100 g) manufactured by Mitsubishi Chemical Corporation Silane coupling agent: Si69 (bis(3-triethoxysilylpropyl)tetrasulfide) manufactured by Evonik Degussa Oil: Process X-140 (aroma oil) manufactured by Japan Energy Corporation Anti-aging agent: Antigen 6C (N-(1,3-dimethylbutyl)-N'-phenyl-p-phenylenediamine) manufactured by Sumitomo Chemical Co. LTD.

Stearic acid: Stearic acid Tsubaki manufactured by NOF Corporation Zinc oxide: ZINC FLOWER No. 1 manufactured by Mitsui Mining & Smelting Co., Ltd.

Wax: SUNNOC N manufactured by OUCHI SHINKO CHEMICAL INDUSTRIAL CO., LTD.

Sulfur: sulfur powder manufactured by Karuizawa Sulfur Co., Ltd. Vulcanization accelerator CZ: NOCCELER CZ (N-cyclohexyl-2-benzothiazolylsulfenamide) manufactured by OUCHI SHINKO CHEMICAL INDUSTRIAL CO., LTD.

Vulcanization accelerator DM: Nocceler DM (di-2-benzothiazolyldisulfide) manufactured by OUCHI SHINKO CHEMICAL INDUSTRIAL CO., LTD.

Production Method of SBR 2

To a sufficiently nitrogen-substituted heat-resistant reaction vessel of 30 L were added 18 L of n-hexane, 600 g of styrene, 1,400 g of butadiene, 15.1 ml of THF and 4.6 mmol of n-butyllithium, followed by stirring at 50° C. for five hours to carry out a polymerization reaction. Then, ethanol was added thereto to stop the reaction and to the reaction solution was added 1 g of 2,6-di-tert-butyl-p-cresol. Thereafter, stream stripping was conducted to collect an aggregate from a polymer solution and the obtained aggregate was dried under reduced pressure for 24 hours to obtain the SBR 2. The obtained SBR 2 has a weight-average molecular weight (Mw) of 480,000 and a styrene content of 30% by mass.

Production Method of SBR 3

To a sufficiently nitrogen-substituted heat-resistant reaction vessel of 30 L were added 18 L of n-hexane, 700 g of styrene, 1,300 g of butadiene, 3.6 ml of THF and 4.9 mmol of n-butyllithium, followed by stirring at 30° C. for five hours to carry out a polymerization reaction. Then, ethanol was added thereto to stop the reaction and to the reaction solution was added 1 g of 2,6-di-tert-butyl-p-cresol. Thereafter, reprecipitation purification was conducted to obtain the SBR 3. The obtained SBR 3 has a weight-average molecular weight (Mw) of 450,000 and a styrene content of 35% by mass.

Production Method of SBR 5

To a sufficiently nitrogen-substituted heat-resistant reaction vessel of 30 L were added 18 L of n-hexane, 800 g of styrene, 1,200 g of butadiene, 1.7 ml of THF and 4.8 mmol of n-butyllithium, followed by stirring at 50° C. for five hours to carry out a polymerization reaction. Then, ethanol was added thereto to stop the reaction and to the reaction solution was added 1 g of 2,6-di-tert-butyl-p-cresol. Thereafter, reprecipitation purification was conducted to obtain the SBR 5. The obtained SBR 5 has a weight-average molecular weight (Mw) of 460,000 and a styrene content of 40% by mass.

Production Method of SBR 6

To a sufficiently nitrogen-substituted heat-resistant reaction vessel of 30 L were added 18 L of n-hexane, 700 g of styrene, 1,300 g of butadiene, 3.2 ml of THF and 4.8 mmol of n-butyllithium, followed by stirring at 50° C. for five hours to carry out a polymerization reaction. Then, ethanol was added thereto to stop the reaction and to the reaction solution was added 1 g of 2,6-di-tert-butyl-p-cresol. Thereafter, reprecipitation purification was conducted to obtain the SBR 6. The obtained SBR 6 has a weight-average molecular weight (Mw) of 460,000 and a styrene content of 35% by mass.

Production Method of SBR 7

To a sufficiently nitrogen-substituted heat-resistant reaction vessel of 30 L were added 18 L of n-hexane, 600 g of styrene, 1,400 g of butadiene, 1.8 ml of THF and 4.9 mmol of n-butyllithium, followed by stirring at 50° C. for five hours to carry out a polymerization reaction. Then, ethanol was added thereto to stop the reaction and to the reaction solution was added 1 g of 2,6-di-tert-butyl-p-cresol. Thereafter, reprecipitation purification was conducted to obtain the SBR 7. The obtained SBR 7 has a weight-average molecular weight (Mw) of 460,000 and a styrene content of 30% by mass.

Production Method of SBR 8
Preparation of Modifier

Under a nitrogen atmosphere, 7.0 g of bis(dimethylamino)methylvinylsilane manufactured by Wako Pure Chemical Industries, Ltd. was put into a 100 ml measuring flask, and hexane anhydride was further added to make a total amount of 100 ml to prepare a modifier.

To a sufficiently nitrogen-substituted heat-resistant reaction vessel of 30 L were added 18 L of n-hexane, 800 g of styrene, 1,200 g of butadiene, 1.7 ml of THF and 4.2 mmol of n-butyllithium, followed by stirring at 50° C. for five hours. Then, 10 ml of the above modifier was added, and then the mixture was stirred for 30 minutes. Ethanol was added thereto to stop the reaction and to the reaction solution was added 1 g of 2,6-di-tert-butyl-p-cresol. Thereafter, reprecipitation purification was conducted to obtain the SBR 8. The obtained SBR 8 has a weight-average molecular weight (Mw) of 470,000 and a styrene content of 40% by mass.

Examples and Comparative Examples

According to compounding formulations shown in Table 1, chemicals other than sulfur and vulcanization accelerators were kneaded with a 1.7 L enclosed Banbury mixer for five minutes until the temperature reached 150° C. to obtain a kneaded product. Then, to the kneaded product were added sulfur and the vulcanization accelerators, and the mixture was kneaded under the condition of 80° C. for 3 minutes to obtain an unvulcanized rubber composition. The obtained unvulcanized rubber composition was subjected to press vulcanization at 170° C. for 12 minutes to obtain a vulcanized rubber composition. Further, the obtained unvulcanized rubber composition was formed into the shape of a tread, laminated with other components of the tire in a tire building machine, and vulcanized at 170° C. for 12 minutes to obtain a tire for test (size: 195/65R15).

With respect to the obtained unvulcanized rubber compositions, vulcanized rubber compositions and tires for test, the following evaluation was conducted. The results are shown in Table 1.

Index of Processability

A Mooney viscosity (MI4-4) of the unvulcanized rubber compositions was measured at 130° C. in accordance with JIS K6300-1. The results are indicated with an index, assuming the result of Comparative Example 1 to be 100. The larger the index is, the more excellent the processability is. A target value for performance of the index of processability is not less than 90.

Index of Fuel Efficiency

A loss tangent (tan δ at high temperature) of each vulcanized rubber composition was measured using a viscoelasticity spectrometer VES (manufactured by IWAMOTO Quartz GlassLabo Co., Ltd.) under the conditions of a. temperature of 30° C., a frequency of 10 Hz, an initial strain of 10% and a dynamic strain of 2%. The results are indicated with an index, assuming the result of Comparative Example 1 to be 100. The larger the index is, the more excellent the fuel efficiency is. A target value for performance of the index of fuel efficiency is not less than 95.

Index of Wet Grip Performance

Each tire for test was mounted on all wheels of a vehicle (2000 cc domestic FF car) and a braking distance after braking at an initial speed of 100 km/h on a wet asphalt road was measured. The results are indicated with an index and the larger the index is, the more excellent the wet skid performance (wet grip performance) is. The index was calculated by the following formula. A target value for performance of the index of wet grip performance is not less than 102. (Index of wet grip performance)=(Braking distance of reference Comparative Example)/(Braking distance of each compounding formulation)×100

Index of Abrasion Resistance

A volume loss of each vulcanized rubber composition was measured under the conditions of a load of 50 N, a speed of 20 km/h, and a slipping angle of 5° by use of a LAT tester (Laboratory Abrasion and Skid Tester). The results are indicated with an index, assuming the result of Comparative Example 1 to be 100. The larger the index is, the more excellent the abrasion resistance is. A target value for performance of the index of abrasion resistance is not less than 102.

TABLE 1

|  | COM. EX. | | | EXAMPLES | | | | | | | | |
| --- | --- | --- | --- | --- | --- | --- | --- | --- | --- | --- | --- | --- |
|  | 1 | 2 | 3 | 1 | 2 | 3 | 4 | 5 | 6 | 7 | 8 | 9 |
| Compounded amount (part by mass) | | | | | | | | | | | | |
| SBR 1 | 80 | — | — | — | — | — | — | — | — | — | — | — |
| SBR 2 | — | 80 | — | — | — | — | — | — | — | — | — | — |
| SBR 3 | — | — | 80 | — | — | — | — | — | — | — | — | — |
| SBR 4 | — | — | — | 110 | — | — | — | — | — | — | — | — |
| SBR 5 | — | — | — | — | 80 | — | — | — | — | — | — | 30 |
| SBR 6 | — | — | — | — | — | 80 | — | — | — | — | — | — |
| SBR 7 | — | — | — | — | — | — | 80 | — | — | — | — | — |
| SBR 8 | — | — | — | — | — | — | — | 80 | 80 | 50 | 20 | 50 |
| BR | 20 | 20 | 20 | 20 | 20 | 20 | 20 | 20 | — | 50 | 80 | 20 |
| NR | — | — | — | — | — | — | — | — | 20 | — | — | — |
| Silica | 80 | 80 | 80 | 80 | 80 | 80 | 80 | 80 | 80 | 80 | 80 | 80 |
| Carbon black | 5 | 5 | 5 | 5 | 5 | 5 | 5 | 5 | 5 | 5 | 5 | 5 |
| Silane coupling agent | 8 | 8 | 8 | 8 | 8 | 8 | 8 | 8 | 8 | 8 | 8 | 8 |
| Oil | 25 | 25 | 25 | 25 | 25 | 25 | 25 | 25 | 25 | 25 | 25 | 25 |
| Anti-aging agent | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Zinc oxide | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 | 1.5 | 1.5 | 1.5 |
| Vulcanization accelerator 1 | 2 | 2 | 2 | 2 | 2 | 2 | 2 | 2 | 2 | 2 | 2 | 2 |
| Vulcanization accelerator 2 | 2 | 2 | 2 | 2 | 2 | 2 | 2 | 2 | 2 | 2 | 2 | 2 |
| Evaluation | | | | | | | | | | | | |
| Index of processability | 100 | 98 | 98 | 80 | 101 | 103 | 97 | 96 | 94 | 104 | 103 | 102 |
| Index of fuel efficiency | 100 | 99 | 99 | 105 | 102 | 98 | 98 | 112 | 111 | 108 | 105 | 101 |
| Index of wet grip performance | 100 | 101 | 101 | 113 | 113 | 108 | 114 | 113 | 114 | 104 | 105 | 112 |
| Index of abrasion resistance | 100 | 101 | 101 | 109 | 108 | 105 | 109 | 107 | 108 | 103 | 104 | 106 |

From the results of Table 1, it can be seen that the rubber composition and the tire having a tread composed of the rubber composition of the examples are excellent in wet grip performance and abrasion resistance while maintaining processability and fuel efficiency.

What is claimed is:

1. A rubber composition comprising a rubber component comprising 20 to 90% by mass of a rubber component A and 10 to 80% by mass of a rubber component B,
   wherein an SP value of the rubber component A is not less than 17.8 $(J/cm^3)^{1/2}$ and
   an SP value of the rubber component B is lower than the SP value of the rubber component A by not less than 0.6 $(J/cm^3)^{1/2}$.

2. The rubber composition of claim 1, wherein the rubber component A comprises a styrene-butadiene rubber.

3. The rubber composition of claim 1, wherein the rubber component A comprises a modified styrene-butadiene rubber.

4. The rubber composition of claim 1, wherein a content of the rubber component A is 50 to 90% by mass and a content of the rubber component B is 10 to 50% by mass.

5. The rubber composition of claim 1, wherein the rubber composition comprises 10 to 200 parts by mass of silica based on 100 parts by mass of the rubber component.

6. The rubber composition of claim 1, wherein a weight-average molecular weight of the rubber component A is not more than 800,000.

7. A tire having a tread composed of the rubber composition of claim 1.

8. The rubber composition of claim 1, wherein the SP value of the rubber component B is not less than 16.0 $(J/cm^3)^{1/2}$.

* * * * *